United States Patent
Parthasarathy et al.

(10) Patent No.: US 12,045,282 B2
(45) Date of Patent: Jul. 23, 2024

(54) FAULT LOCALIZATION AND ALERT AGGREGATION

(71) Applicant: International Business Machines Corporation, Armonk, NY (US)

(72) Inventors: Srinivasan Parthasarathy, White Plains, NY (US); Fabio A. Oliveria, White Plains, NY (US); Sushma Ravichandran, White Plains, NY (US); Tamar Eilam, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/832,478

(22) Filed: Mar. 27, 2020

(65) Prior Publication Data
US 2021/0303632 A1    Sep. 30, 2021

(51) Int. Cl.
| | |
|---|---|
| G06F 16/901 | (2019.01) |
| G06F 16/9035 | (2019.01) |
| G06F 16/9038 | (2019.01) |
| G06F 17/16 | (2006.01) |

(52) U.S. Cl.
CPC ...... *G06F 16/9024* (2019.01); *G06F 16/9035* (2019.01); *G06F 16/9038* (2019.01); *G06F 17/16* (2013.01)

(58) Field of Classification Search
None
See application file for complete search history.

(56) References Cited

U.S. PATENT DOCUMENTS

| | | | |
|---|---|---|---|
| 7,752,024 B2 | 7/2010 | Ball et al. | |
| 8,892,415 B2 | 11/2014 | Bourlatchkov et al. | |
| 9,413,685 B1 | 8/2016 | Lam et al. | |
| 9,690,553 B1 * | 6/2017 | Brodie | G06F 8/71 |
| 10,454,752 B2 | 10/2019 | Margalit et al. | |

(Continued)

OTHER PUBLICATIONS

Giorgos EP3322127A1—Nov. 13, 2017—A method and computer programs for identifying video streaming qoe from network traffic (Year: 2017).*

(Continued)

*Primary Examiner* — Kris E Mackes
*Assistant Examiner* — Soheila (Gina) Davanlou
(74) *Attorney, Agent, or Firm* — Amin, Turocy & Watson, LLP

(57) ABSTRACT

Systems, computer-implemented methods, and computer program products to facilitate fault localization and alert aggregation are provided. According to an embodiment, a system can comprise a memory that stores computer executable components and a processor that executes the computer executable components stored in the memory. The computer executable components can comprise a graph component that employs an algorithm to generate a directed graph of computing elements having performance alerts in one or more abstraction layers of a computing environment. The computer executable components can further comprise a fault localization component that employs a topological sort algorithm to identify one or more of the computing elements causing the performance alerts based on the directed graph.

23 Claims, 11 Drawing Sheets

(56) References Cited

U.S. PATENT DOCUMENTS

| | | | | |
|---|---|---|---|---|
| 2013/0080350 | A1* | 3/2013 | Bhola | G06Q 10/067 |
| | | | | 705/348 |
| 2014/0279718 | A1* | 9/2014 | Southey | G06N 5/04 |
| | | | | 706/11 |
| 2014/0320500 | A1* | 10/2014 | Fletcher | G06F 11/3409 |
| | | | | 345/440 |
| 2014/0343965 | A1* | 11/2014 | Miyoshi | G16H 10/60 |
| | | | | 705/3 |
| 2016/0202962 | A1* | 7/2016 | Arif | G06F 9/45558 |
| | | | | 717/174 |
| 2016/0380846 | A1 | 12/2016 | Boerner et al. | |
| 2017/0093645 | A1 | 3/2017 | Zhong et al. | |
| 2017/0272331 | A1 | 9/2017 | Lissack | |
| 2019/0018904 | A1* | 1/2019 | Russell | G06F 16/27 |
| 2019/0087253 | A1* | 3/2019 | Li | G06F 11/076 |
| 2019/0102469 | A1 | 4/2019 | Makovsky et al. | |

OTHER PUBLICATIONS

Pecchia et al., "Filtering Security Alerts for the Analysis of a Production SaaS Cloud," IEEE/ACM 7th International Conference on Utility and Cloud Computing. doi: 10.1109/ucc.2014.32, 2014, 9 pages.

Mell et al., "The NIST Definition of Cloud Computing," Recommendations of the National Institute of Standards and Technology, NIST Special Publication 800-145, Sep. 2011, 7 pages.

Wu, et al., "Zeno: Diagnosing Performance Problems with Temporal Provenance," Proceedings of the 16th USENIX Symposium on Networked Systems Design and Implementation, Feb. 26-28, 2019, 27 pages.

Luo, et al., "Troubleshooting Transiently-Recurring Errors in Production Systems with Blame-Proportional Logging," Proceedings of the 2018 USENIX Annual Technical Conference, Jul. 11-13, 2018, 15 pages.

Gan, et al., "Seer: Leveraging Big Data to Navigate the Increasing Complexity of Cloud Debugging," arXiv:1804.09136v1 [cs.DC], Apr. 24, 2018, 7 pages.

Kaldor et al., "Canopy: An End-to-End Performance Tracing And Analysis System," SOSP '17, Oct. 28, 2017, 17 pages.

"OpenZipkin • A distributed tracing system," https://zipkin.io/, 4 pages, Retrieved from the Internet: Mar. 23, 2020.

"Jaeger: open source, end-to-end distributed tracing," https://www.jaegertracing.io/, 7 pages, Retrieved from the Internet: Mar. 23, 2020.

"Prometheus—Monitoring system & time series database," https://prometheus.io/, 5 pages, Retrieved from the Internet: Mar. 23, 2020.

"Real-time visibility into stacks, sensors and systems, InfluxDB is the open source time series database," https://www.influxdata.com/, 8 pages, Retrieved from the Internet: Mar. 23, 2020.

* cited by examiner

FAULT LOCALIZATION AND ALERT AGGREGATION

BACKGROUND

The subject disclosure relates to fault localization and alert aggregation, and more specifically, to fault localization and alert aggregation based on topology of computing elements in one or more abstraction layers of a computing environment.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate fault localization and alert aggregation are described.

According to an embodiment, a system can comprise a memory that stores computer executable components and a processor that executes the computer executable components stored in the memory. The computer executable components can comprise a graph component that employs an algorithm to generate a directed graph of computing elements having performance alerts in one or more abstraction layers of a computing environment. The computer executable components can further comprise a fault localization component that employs a topological sort algorithm to identify one or more of the computing elements causing the performance alerts based on the directed graph.

According to another embodiment, a computer-implemented method can comprise employing, by a system operatively coupled to a processor, an algorithm to generate a directed graph of computing elements having performance alerts in one or more abstraction layers of a computing environment. The computer-implemented method can further comprise employing, by the system, a topological sort algorithm to identify one or more of the computing elements causing the performance alerts based on the directed graph.

According to another embodiment, a computer program product facilitating a fault localization and performance alert aggregation process is provided. The computer program product comprising a computer readable storage medium having program instructions embodied therewith, the program instructions executable by a processor to cause the processor to employ, by the processor, an algorithm to generate a directed graph of computing elements having performance alerts in one or more abstraction layers of a computing environment. The program instructions are further executable by the processor to cause the processor to employ, by the processor, a topological sort algorithm to identify one or more of the computing elements causing the performance alerts based on the directed graph.

According to an embodiment, a system can comprise a memory that stores computer executable components and a processor that executes the computer executable components stored in the memory. The computer executable components can comprise a graph component that employs an algorithm to generate a directed graph of computing elements having performance alerts in one or more abstraction layers of a computing environment. The computer executable components can further comprise a fault localization component that employs a topological sort algorithm to identify one or more of the computing elements causing the performance alerts based on the directed graph. The computer executable components can further comprise a signature component that assigns a semantic signature to the directed graph.

According to another embodiment, a computer-implemented method can comprise employing, by a system operatively coupled to a processor, an algorithm to generate a directed graph of computing elements having performance alerts in one or more abstraction layers of a computing environment. The computer-implemented method can further comprise employing, by the system, a topological sort algorithm to identify one or more of the computing elements causing the performance alerts based on the directed graph. The computer-implemented method can further comprise assigning, by the system, a semantic signature to the directed graph.

DETAILED DESCRIPTION

Figure 1:
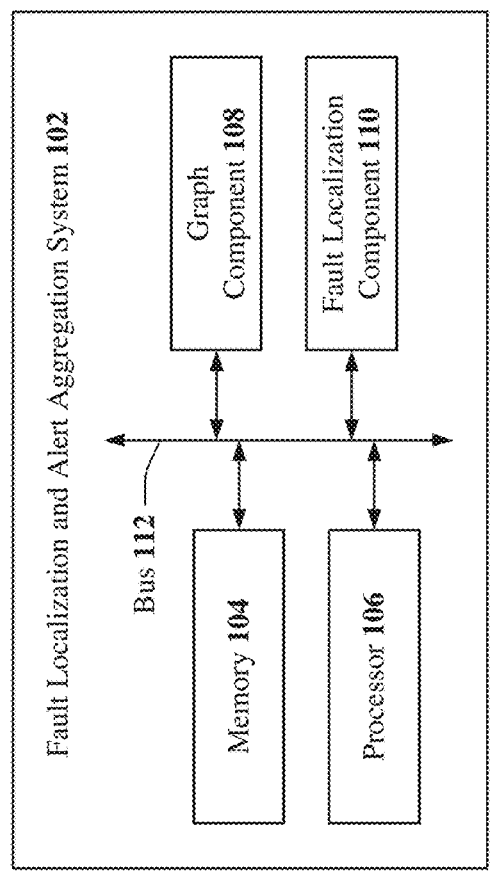
FIGS. 1 and 2 illustrate block diagrams of example, non-limiting systems that can facilitate fault localization and alert aggregation in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Continuous monitoring of computing elements such as, for instance, the infrastructure (e.g., computing nodes) and services (e.g., applications) in a computing environment (e.g., a cloud computing environment) is an important aspect of the computing environment operations (e.g., cloud computing operations (CloudOps)). A problem with existing technologies that perform such monitoring is that they generate numerous performance alerts corresponding to one or more of the computing elements, resulting in alert flood. Alerting too aggressively can cause alert fatigue to the development operations (DevOps) engineering team due to high rate of false positives. On the other hand, suppressing alerts can lead to missed detection of performance problems thereby affecting quality of service (QOS).

Given the problem described above with existing technologies that monitor computing elements (e.g., infrastructure, services, etc.) of a computing environment (e.g., a cloud computing environment), the present disclosure can be implemented to produce a solution to this problem in the form of systems, computer-implemented methods, and/or computer program products that can employ an algorithm to generate a directed graph of computing elements having performance alerts in one or more abstraction layers of a computing environment; and/or employs a topological sort algorithm to identify one or more of the computing elements causing the performance alerts based on the directed graph. In some embodiments, such systems, computer-implemented methods, and/or computer program products of the present disclosure can be implemented to further assign a semantic signature to the directed graph. An advantage of such systems, computer-implemented methods, and/or computer program products of the subject disclosure is that they can be implemented to generate an aggregate alert comprising all the performance alerts in the form of a visually displayed directed subgraph that illustrates all the computing elements for which the performance alerts have been generated and the relationships between the computing elements across one or more abstraction layers to facilitate reduced alert fatigue, improved fault localization (e.g., improved root cause identification), and/or reduced disruption of and/or damage to such computing elements.

FIG. 1 illustrates a block diagram of an example, non-limiting system 100 that can facilitate fault localization and alert aggregation in accordance with one or more embodiments described herein. System 100 can comprise a fault localization and alert aggregation system 102, which can be associated with a cloud computing environment. For example, fault localization and alert aggregation system 102 can be associated with cloud computing environment 950 described below with reference to FIG. 9 and/or one or more functional abstraction layers described below with reference to FIG. 10 (e.g., hardware and software layer 1060, virtualization layer 1070, management layer 1080, and/or workloads layer 1090).

Fault localization and alert aggregation system 102 and/or components thereof (e.g., graph component 108, fault localization component 110, alert component 202, signature component 204, etc.) can employ one or more computing resources of cloud computing environment 950 described below with reference to FIG. 9 and/or one or more functional abstraction layers (e.g., quantum software, etc.) described below with reference to FIG. 10 to execute one or more operations in accordance with one or more embodiments of the subject disclosure described herein. For example, cloud computing environment 950 and/or such one or more functional abstraction layers can comprise one or more classical computing devices (e.g., classical computer, classical processor, virtual machine, server, etc.), quantum hardware, and/or quantum software (e.g., quantum computing device, quantum computer, quantum processor, quantum circuit simulation software, superconducting circuit, etc.) that can be employed by fault localization and alert aggregation system 102 and/or components thereof to execute one or more operations in accordance with one or more embodiments of the subject disclosure described herein. For instance, fault localization and alert aggregation system 102 and/or components thereof can employ such one or more classical and/or quantum computing resources to execute one or more classical and/or quantum: mathematical function, calculation, and/or equation; computing and/or processing script; algorithm; model (e.g., artificial intelligence (AI) model, machine learning (ML) model, etc.); and/or another operation in accordance with one or more embodiments of the subject disclosure described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

As illustrated in FIG. 1, fault localization and alert aggregation system 102 can comprise a memory 104, a processor 106, a graph component 108, a fault localization component 110, and/or a bus 112.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100 and/or fault localization and alert aggregation system 102 can further comprise various computer and/or computing-based elements described herein with reference to operating environment 800 and FIG. 8. In several embodiments, such computer and/or computing-based elements can be used in connection with implementing one or more of the systems, devices, components, and/or computer-implemented operations shown and described in connection with FIG. 1 or other figures disclosed herein.

Memory 104 can store one or more computer and/or machine readable, writable, and/or executable components and/or instructions that, when executed by processor 106 (e.g., a classical processor, a quantum processor, etc.), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to fault localization and alert aggregation system 102, graph component 108, fault localization component 110, and/or another component associated with fault localization and alert aggregation system 102 (e.g., alert component 202, signature component 204, etc.), as described herein with or without reference to the various figures of the subject disclosure.

Memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 816 and FIG. 8. Such examples of memory 104 can be employed to implement any embodiments of the subject disclosure.

Processor 106 can comprise one or more types of processors and/or electronic circuitry (e.g., a classical processor, a quantum processor, etc.) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor. Further examples of processor 106 are described below with reference to processing unit 814 and FIG. 8. Such examples of processor 106 can be employed to implement any embodiments of the subject disclosure.

Fault localization and alert aggregation system 102, memory 104, processor 106, graph component 108, fault localization component 110, and/or another component of fault localization and alert aggregation system 102 as described herein (e.g., alert component 202, signature component 204, etc.) can be communicatively, electrically, operatively, and/or optically coupled to one another via a bus 112 to perform functions of system 100, fault localization and alert aggregation system 102, and/or any components coupled therewith. Bus 112 can comprise one or more memory bus, memory controller, peripheral bus, external bus, local bus, a quantum bus, and/or another type of bus that can employ various bus architectures. Further examples of bus 112 are described below with reference to system bus 818 and FIG. 8. Such examples of bus 112 can be employed to implement any embodiments of the subject disclosure.

Fault localization and alert aggregation system 102 can comprise any type of component, machine, device, facility, apparatus, and/or instrument that comprises a processor and/or can be capable of effective and/or operative communication with a wired and/or wireless network. All such embodiments are envisioned. For example, fault localization and alert aggregation system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Fault localization and alert aggregation system 102 can be coupled (e.g., communicatively, electrically, operatively, optically, etc.) to one or more external systems, sources, and/or devices (e.g., classical and/or quantum computing devices, communication devices, etc.) via a data cable (e.g., High-Definition Multimedia Interface (HDMI), recommended standard (RS) 232, Ethernet cable, etc.). In some embodiments, fault localization and alert aggregation system 102 can be coupled (e.g., communicatively, electrically, operatively, optically, etc.) to one or more external systems, sources, and/or devices (e.g., classical and/or quantum computing devices, communication devices, etc.) via a network.

In some embodiments, such a network can comprise wired and wireless networks, including, but not limited to, a cellular network, a wide area network (WAN) (e.g., the Internet) or a local area network (LAN). For example, fault localization and alert aggregation system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, fault localization and alert aggregation system 102 can thus include hardware (e.g., a central processing unit (CPU), a transceiver, a decoder, quantum hardware, a quantum processor, etc.), software (e.g., a set of threads, a set of processes, software in execution, quantum pulse schedule, quantum circuit, quantum gates, etc.) or a combination of hardware and software that facilitates communicating information between fault localization and alert aggregation system 102 and external systems, sources, and/or devices (e.g., computing devices, communication devices, etc.).

Fault localization and alert aggregation system 102 can comprise one or more computer and/or machine readable, writable, and/or executable components and/or instructions that, when executed by processor 106 (e.g., a classical processor, a quantum processor, etc.), can facilitate performance of operations defined by such component(s) and/or instruction(s). Further, in numerous embodiments, any component associated with fault localization and alert aggregation system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, graph component 108, fault localization component 110, and/or any other components associated with fault localization and alert aggregation system 102 as disclosed herein (e.g., communicatively, electronically, operatively, and/or optically coupled with and/or employed by fault localization and alert aggregation system 102), can comprise such computer and/or machine readable, writable, and/or executable component(s) and/or instruction(s). Consequently, according to numerous embodiments, fault localization and alert aggregation system 102 and/or any components associated therewith as disclosed herein, can employ processor 106 to execute such computer and/or machine readable, writable, and/or executable component(s) and/or instruction(s) to facilitate performance of one or more operations described herein with reference to fault localization and alert aggregation system 102 and/or any such components associated therewith.

Fault localization and alert aggregation system 102 can facilitate (e.g., via processor 106) performance of operations executed by and/or associated with graph component 108 and/or fault localization component 110, and/or another component associated with fault localization and alert aggregation system 102 as disclosed herein (e.g., alert component 202, signature component 204, etc.). For example, as described in detail below, fault localization and alert aggregation system 102 can facilitate via processor 106 (e.g., a classical processor, a quantum processor, etc.): employing an algorithm to generate a directed graph of computing elements having performance alerts in one or more abstraction layers of a computing environment; and/or employing a topological sort algorithm to identify one or more of the computing elements causing the performance alerts based on the directed graph.

In another example, as described in detail below, fault localization and alert aggregation system 102 can further facilitate via processor 106 (e.g., a classical processor, a quantum processor, etc.): assigning a semantic signature to the directed graph; generating an aggregate alert of the performance alerts based on at least one of a structural change to the directed graph or a change to a key performance indicator vector corresponding to the directed graph; and/or generating an aggregate alert of the performance alerts and/or assigning one or more alert suppression rules to the aggregate alert to reduce a quantity of at least one of the performance alerts or the aggregate alert, thereby facilitating at least one of improved processing performance, improved processing efficiency, or reduced computational costs of the processor. In the examples above: the directed graph can comprise a visual representation of one or more topological relationships of the computing elements across the one or more abstraction layers; the computing elements can comprise at least one of an application service or a worker node; the one or more abstraction layers can comprise at least one of an application layer or an infrastructure layer; the semantic signature can comprise at least one of a topological signature or a temporal signature; and/or the semantic signature can comprise at least one of a textual description or a graphical description of the directed graph.

Graph component 108 can employ an algorithm to generate a directed graph of computing elements having performance alerts in one or more abstraction layers of a computing environment. For example, graph component 108 can employ an algorithm including, but not limited to, a connected components algorithm, a linear-time algorithm, a breadth-first search algorithm, and/or another algorithm to generate a directed graph of computing elements having performance alerts in one or more abstraction layers of a computing environment.

In an example, graph component 108 can employ one or more of the algorithms defined above (e.g., a connected components algorithm, a linear-time algorithm, a breadth-first search algorithm, etc.) to generate a directed acyclic graph (DAG) of computing elements having performance alerts in one or more abstraction layers of a computing environment. In this example, such one or more abstraction layers can include, but are not limited to, an application layer, an infrastructure layer, and/or another abstraction layer (e.g., a functional abstraction layer) of a computing environment such as, for instance, a classical computing environment (e.g., a classical computing network), a cloud computing environment, and/or another computing environment. In another example, such a computing environment can comprise cloud computing environment 950 described below and illustrated in FIG. 9 and such one or more abstraction layers can comprise one or more functional abstraction layers provided by cloud computing environment 950 as described below and illustrated in FIG. 10. For instance, such one or more abstraction layers can comprise hardware and software layer 1060, virtualization layer 1070, management layer 1080, and/or workloads layer 1090 described below and illustrated in FIG. 10.

In some embodiments, graph component 108 can employ one or more of the algorithms defined above (e.g., a connected components algorithm, a linear-time algorithm, a breadth-first search algorithm, etc.) to generate a directed acyclic graph (DAG) of computing elements having performance alerts in one or more abstraction layers of a computing environment, where such computing elements can include, but are not limited to, an application service, a worker node, a host, a cluster node (e.g., heterogenous cluster), a link between application services, an agent, a virtual machine, and/or another computing element. In an example, such computing elements can comprise one or more cloud computing nodes 910 described below and illustrated in FIG. 9. In some embodiments, such computing elements can comprise one or more components of one or more of the functional abstraction layers provided by cloud computing environment 950 as described below and illustrated in FIG. 10. In an example, such computing elements can comprise one or more components of hardware and software layer 1060 (e.g., mainframes 1061, reduced instruction set computer (RISC) architecture based servers 1062, servers 1063, blade servers 1064, storage devices 1065, networks and networking components 1066, network application server software 1067, database software 1068, quantum platform routing software (not illustrated in FIG. 10), and/or quantum software (not illustrated in FIG. 10)). In another example, such computing elements can comprise one or more components of virtualization layer 1070 (e.g., virtual servers 1071, virtual storage 1072, virtual networks 1073 (e.g., including virtual private networks), virtual applications and operating systems 1074, and/or virtual clients 1075). In another example, such computing elements can comprise one or more components of management layer 1080 (e.g., resource provisioning 1081, metering and pricing 1082, user portal 1083, service level management 1084, and/or service level agreement (SLA) planning and fulfillment 1085). In another example, such computing elements can comprise one or more components of workloads layer 1090 (e.g., mapping and navigation 1091, software development and lifecycle management 1092, virtual classroom education delivery 1093, data analytics processing 1094, transaction processing 1095, and/or fault localization and alert aggregation software 1096).

In the examples above, such performance alerts can be generated based on detection of one or more performance problems with one or more of such computing elements described above. To facilitate detection of such one or more performance problems defined above that can trigger the performance alerts, fault localization and alert aggregation system 102 and/or graph component 108 can utilize one or more monitoring components (not illustrated in the figures) that can monitor performance data of the respective computing elements defined above and detect such one or more performance problems.

In an example, fault localization and alert aggregation system 102 and/or graph component 108 can utilize one or more monitoring components that can employ one or more detection techniques to detect such one or more performance problems of such one or more computing elements defined above. In this example, such detection technique(s) can include, but are not limited to: cumulative sum control chart (CUSUM) based abrupt latency shift detection using a time series change detection algorithm; causality tests; statistical hypothesis test (e.g., to determine if service degradations are cascaded or not); time series causality tests (e.g., Granger causality, convergent cross mapping) between key performance indicators (KPI) associated with respective computing elements (e.g., between KPIs associated with worker nodes and application services); statistical and time series based unsupervised causality analysis; and/or another detection technique. In this example, fault localization and alert aggregation system 102 and/or graph component 108 can utilize such one or more monitoring components that can employ one or more of the detection techniques defined above to detect one or more performance problems including, but not limited to: a faulty or degraded worker node; a faulty or degraded application service; a route misconfiguration; an overloaded infrastructure component; latency of a computing element (e.g., a link) changes abruptly; error rate of a computing element (e.g., a worker node) is beyond a fixed threshold (e.g., a defined threshold); central processing unit (CPU) utilization of a computing element (e.g., a worker node) is beyond a fixed threshold (e.g., a defined threshold); and/or another performance problem.

In some embodiments, as described below with reference to FIG. 4B, such one or more monitoring components described above that can be employed by fault localization and alert aggregation system 102 and/or graph component 108 to detect one or more such performance problems can further utilize such one or more detection techniques defined above to determine (e.g., infer) topological relationships (e.g., dependency relationships) between computing elements having such performance problem(s). For instance, such one or more monitoring components can further utilize such one or more detection techniques defined above to determine (e.g., infer) direction of the arrows on edges 310a and/or 310b described below and illustrated in FIG. 3.

Based on detection of one or more of the performance problems defined above that trigger performance alerts corresponding to the computing elements having such performance problem(s), graph component 108 can employ one or more of the algorithms defined above (e.g., a connected components algorithm, a linear-time algorithm, a breadth-first search algorithm, etc.) to generate a directed graph (e.g., a DAG) of such computing elements. In an example, such a directed graph, which can comprise a directed acyclic graph (DAG), can comprise a visual representation of one or more topological relationships of the computing elements across one or more of the abstraction layers defined above. For instance, graph component 108 can employ one or more of the algorithms defined above (e.g., a connected components algorithm, a linear-time algorithm, a breadth-first search algorithm, etc.) to generate a directed graph such as, for example, directed graph 308a and/or 308b described below and illustrated in FIG. 3. In these examples, graph component 108 can employ one or more of the algorithms defined above (e.g., a connected components algorithm, a linear-time algorithm, a breadth-first search algorithm, etc.) to compute connected components that can constitute the directed graph and can comprise at least two nodes (e.g., at least two of the computing elements defined above) that have a path between them (e.g., a path comprising an edge that denotes a relationship and/or dependency between the nodes).

The connected components algorithm that can be employed by graph component 108 as described above does not take into account the direction of the path (e.g., the direction of the edges) and hence, does not take into account the relationship and/or the dependency (e.g., the topological relationship) between such nodes. However, in some embodiments, as described below, fault localization component 110 can employ a topological sort algorithm that can take into account the relationship and/or the dependency (e.g., the topological relationship) between such nodes of the connected components constituting the directed graph to identify one or more of the computing elements causing the performance alerts.

As described above, fault localization component 110 can employ a topological sort algorithm to identify one or more computing elements causing performance alerts based on a directed graph comprising the one or more computing elements. Additionally, or alternatively, in an embodiment, fault localization component 110 can employ a topological sort algorithm (e.g., Khan's algorithm for topological sorting), a depth-first search algorithm, and/or another algorithm to identify one or more computing elements causing performance alerts based on a directed graph comprising the one or more computing elements.

In an example, fault localization component 110 can employ one or more of the algorithms defined above (e.g., a topological sort algorithm, Khan's algorithm for topological sorting, a depth-first search algorithm, etc.) to identify one or more of the computing elements defined above for which one or more of the performance problems defined above have been detected that trigger the performance alerts. In this example, fault localization component 110 can employ one or more of the algorithms defined above (e.g., a topological sort algorithm, Khan's algorithm for topological sorting, a depth-first search algorithm, etc.) to perform a topological sort (e.g., topological ordering, graph traversal, etc.) of the directed graph (e.g., a DAG) that can be generated by graph component 108 as described above. In this example, such a topological sort of the directed graph (e.g., a DAG) can enable fault localization component 110 to identify one or more of the computing elements in the directed graph that are causing the performance problem(s) defined above using the topological relationships (e.g., edges and/or paths) between such computing elements (e.g., vertices and/or nodes) in the directed graph.

Figure 2:
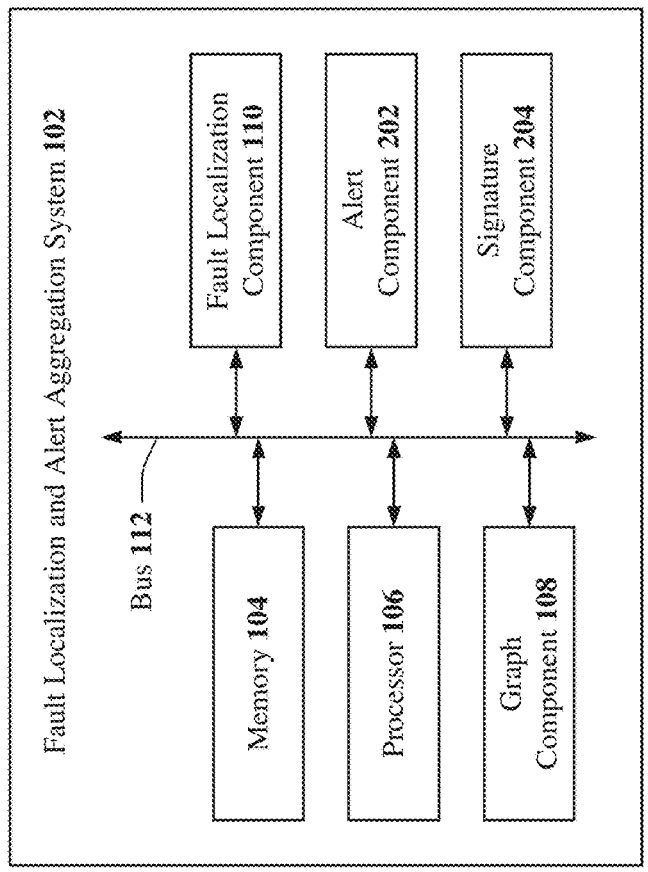

FIG. 2 illustrates a block diagram of an example, non-limiting system 200 that can facilitate fault localization and alert aggregation in accordance with one or more embodiments described herein. System 200 can comprise fault localization and alert aggregation system 102. In some embodiments, fault localization and alert aggregation system 102 can comprise an alert component 202 and/or a signature component 204. Repetitive description of like elements and/or processes employed in respective embodiments is omitted for sake of brevity.

Alert component 202 can generate an aggregate alert of the performance alerts described above with reference to FIG. 1. For example, with reference to FIG. 1, based on detection of one or more of the performance problems defined above that can be caused by one or more of the computing elements defined above, alert component 202, and/or one or more of the monitoring components that can be employed by fault localization and alert aggregation system 102 and/or graph component 108, can generate the performance alerts. In an example, rather than submitting each of the performance alerts to an entity implementing fault localization and alert aggregation system 102 (e.g., an entity such as, for instance, a human, a client, a user, a computing device, a software application, an agent, a machine learning (ML) model, an artificial intelligence (AI) model, etc.), alert component 202 can combine all such performance alerts into a single aggregate alert. In another example, such an aggregate alert can be rendered (e.g., via fault localization and alert aggregation system 102 and/or alert component 202) in the form of a directed graph such as, for instance, the directed graph (e.g., a DAG) that can be generated by graph component 108 as described above with reference to FIG. 1. In this example, such a rendering of the aggregate alert can be submitted (e.g., via fault localization and alert aggregation system 102 and/or alert component 202) to such an entity implementing fault localization and alert aggregation system 102 using, for instance, a display, monitor, and/or screen operatively coupled to fault localization and alert aggregation system 102.

Alert component 202 can assign one or more alert suppression rules to the aggregate alert described above to reduce a quantity of at least one of the performance alerts or the aggregate alert. For example, alert component 202 can assign one or more alert suppression rules such as, for instance, rules that specify certain conditions and/or criteria that can be observed before alert component 202 can render and/or submit the aggregate alert to an entity implementing fault localization and alert aggregation system 102. In this example, such certain conditions and/or criteria can comprise, for instance: defined performance thresholds (e.g., relatively poor performance thresholds) corresponding to the computing elements that can be exceeded before alert component 202 can generate the aggregate alert; defined quantity of performance alerts triggered per computing element before alert component 202 can generate the aggregate alert; a defined change of a first directed graph that can occur before alert component 202 can generate a new aggregate alert in the form of a second directed graph, and/or another condition and/or criterion. In an example, alert component 202 can generate one or more alerts (e.g., an alert for a certain computing element, the aggregate alert described above, etc.) if at least one of the following conditions are satisfied: a certain defined quantity (e.g., 10) HyperText Transfer Protocol (HTTP) 500 Internal Server Error server errors are detected within a certain defined period of time (e.g., within a 3 minute window); and/or the mean latency metric deviates significantly from its predicted value where the prediction comes from a time series forecasting algorithm (e.g., an Auto Regressive Integrated Moving Average (ARIMA) algorithm, an exponential-smoothing algorithm, etc.).

Alert component 202 can generate an aggregate alert of the performance alerts based on at least one of a structural change to a directed graph (e.g., a directed graph generated by graph component 108) or a change to a key performance indicator vector corresponding to the directed graph. For example, alert component 202 can generate the aggregate alert described above based on a structural change to a directed graph generated by graph component 108 such as, for instance: the addition and/or removal of one or more computing elements in the directed graph; the addition and/or removal of one or more abstraction layers in the directed graph; and/or another structural change. In another example, alert component 202 can generate the aggregate alert described above based on a change to a key performance indicator (KPI) vector corresponding to a certain directed graph, where such a KPI vector can comprise a comprehensive (e.g., collective) performance indicator of all the computing elements in such a certain directed graph.

Signature component 204 can assign a semantic signature to a directed graph (e.g., a directed graph generated by graph component 108). For example, signature component 204 can assign a semantic signature to a directed graph generated by graph component 108 as described above, where such a semantic signature can comprise, for instance: a topological signature (e.g., a unique semantic signature that can denote a certain topology of computing elements in one or more abstraction layers of a computing environment or a certain composition (shape) of the directed graph); a temporal signature (e.g., a time stamp corresponding to and/or assigned to the directed graph); and/or another semantic signature. In another example, such a semantic signature described above can comprise, for instance: a textual description of the directed graph (e.g., using one or more letters, numbers, textual characters, words, etc.); a graphical description of the directed graph (e.g., using one or more images, thumbnails, icons, logos, etc.); and/or description of the directed graph.

Figure 3:
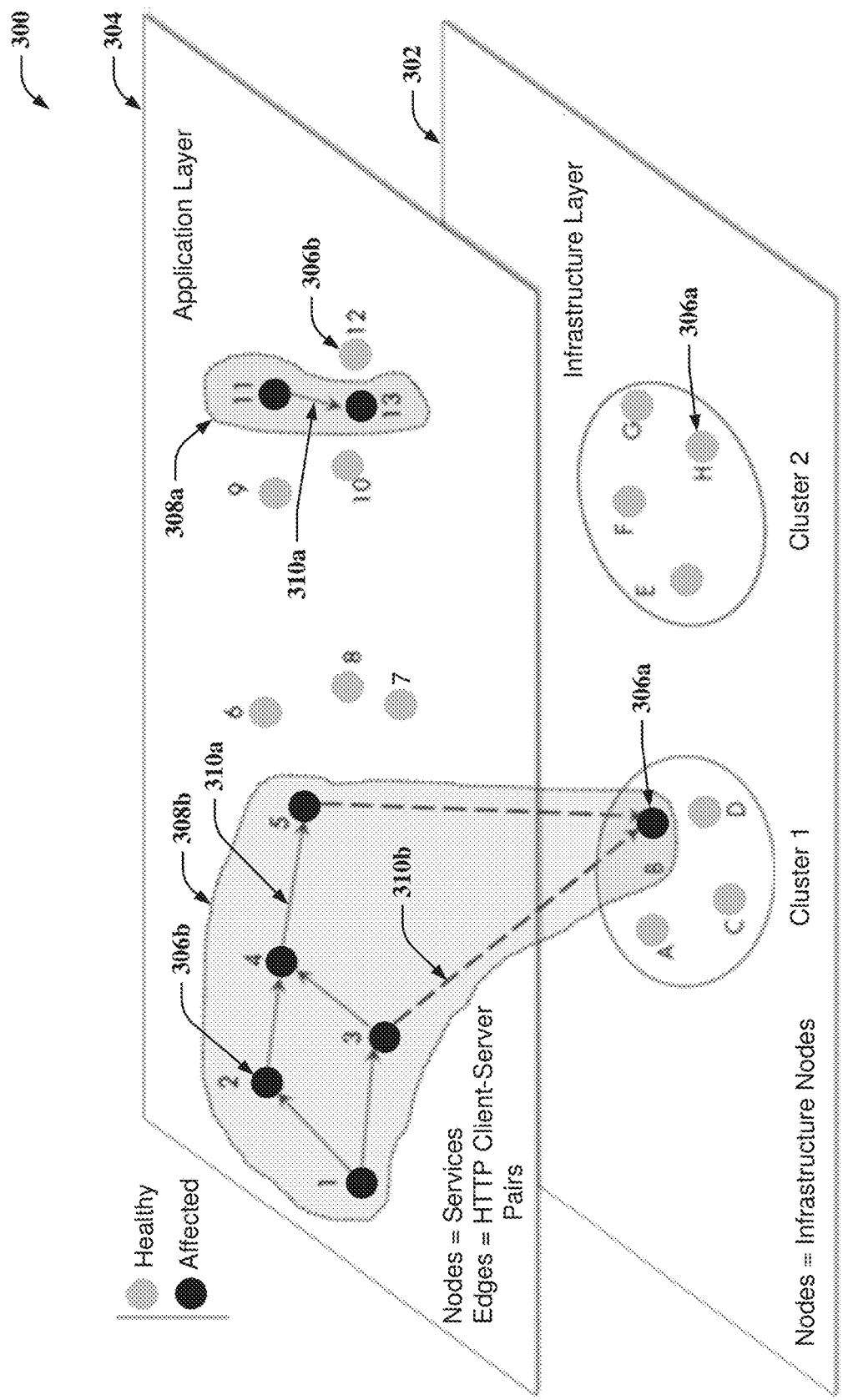
FIG. 3 illustrates a diagram of an example, non-limiting system that can facilitate fault localization and alert aggregation in accordance with one or more embodiments described herein.

FIG. 3 illustrates a diagram of an example, non-limiting system 300 that can facilitate fault localization and alert aggregation in accordance with one or more embodiments described herein. Repetitive description of like elements and/or processes employed in respective embodiments is omitted for sake of brevity.

System 300 can comprise a computing environment, where FIG. 3 illustrates a visual representation of such a computing environment. For example, system 300 can comprise a cloud computing environment (e.g., a multi cloud computing environment) such as, for instance, cloud computing environment 950 described below with reference to FIG. 9.

System 300 can comprise one or more abstraction layers such as, for instance, infrastructure layer 302 and/or application layer 304 illustrated in FIG. 3. In an example, infrastructure layer 302 and/or application layer 304 can each comprise a functional abstraction layer of cloud computing environment 950 described below with reference to FIG. 10 (e.g., hardware and software layer 1060, virtualization layer 1070, management layer 1080, and/or workloads layer 1090).

As illustrated in FIG. 3, infrastructure layer 302 comprise one or more computing elements 306*a* (represented as nodes (e.g., vertices) in FIG. 3 having numerical designations 1-13 respectively assigned thereto) and application layer 304 can comprise one or more computing elements 306*b* (represented as nodes (e.g., vertices) in FIG. 3 having textual designations A-H respectively assigned thereto). Computing elements 306*a* and/or 306*b* can respectively comprise one or more of the computing elements described above with reference to FIG. 1. In an example, computing elements 306*a* can comprise computing elements including, but not limited to, an application service, a link between application services, and/or another computing element. In another example, computing elements 306*b* can comprise computing elements including, but not limited to, a worker node (e.g., one or more infrastructure nodes as denoted in FIG. 3 such as, for instance, a Kubernetes worker), a host, a cluster node (e.g., heterogenous cluster), an agent, a virtual machine, and/or another computing element. As illustrated in FIG. 3, computing elements 306*a* can be grouped together in one or more clusters such as, for instance, heterogenous clusters and/or cluster nodes. For example, as depicted in FIG. 3, computing elements 306*a* denoted as A, B, C, D can be grouped together in Cluster 1 of infrastructure layer 302 and computing elements 306*a* denoted as E, F, G, H can be grouped together in Cluster 2 of infrastructure layer 302.

In some embodiments, computing elements 306*a* and/or 306*b* can comprise one or more components of one or more of the functional abstraction layers provided by cloud computing environment 950 as described below and illustrated in FIG. 10. In an example, computing elements 306*a* and/or 306*b* can respectively comprise one or more components of hardware and software layer 1060 (e.g., mainframes 1061, reduced instruction set computer (RISC) architecture based servers 1062, servers 1063, blade servers 1064, storage devices 1065, networks and networking components 1066, network application server software 1067, database software 1068, quantum platform routing software (not illustrated in FIG. 10), and/or quantum software (not illustrated in FIG. 10)). In another example, computing elements 306*a* and/or 306*b* can respectively comprise one or more components of virtualization layer 1070 (e.g., virtual servers 1071, virtual storage 1072, virtual networks 1073 (e.g., including virtual private networks), virtual applications and operating systems 1074, and/or virtual clients 1075). In another example, computing elements 306*a* and/or 306*b* can respectively comprise one or more components of management layer 1080 (e.g., resource provisioning 1081, metering and pricing 1082, user portal 1083, service level management 1084, and/or service level agreement (SLA) planning and fulfillment 1085). In another example, computing elements 306*a* and/or 306*b* can respectively comprise one or more components of workloads layer 1090 (e.g., mapping and navigation 1091, software development and lifecycle management 1092, virtual classroom education delivery 1093, data analytics processing 1094, transaction processing 1095, and/or fault localization and alert aggregation software 1096).

Based on detection of one or more of the performance problems and/or generation of the performance alerts defined above with reference to FIGS. 1 and 2 that correspond to one or more computing elements 306*a* and/or 306*b*, graph component 108 can use a certain system to visually distinguish computing elements 306*a* and/or 306*b* having such performance problems or performance alerts from computing elements 306*a* and/or 306*b* that do not have such performance problems or performance alerts. For example, as illustrated in FIG. 3, graph component 108 can use black colored nodes to represent computing elements 306*a* and/or 306*b* having such performance problems or performance alerts (denoted as Affected in FIG. 3) and/or gray colored nodes to represent computing elements 306*a* and/or 306*b* that do not have such performance problems or performance alerts (denoted as Healthy in FIG. 3).

Based on detection of such performance problem(s) and/or generation of such performance alerts as described above, graph component 108 can, as described above with reference to FIG. 1, employ an algorithm (e.g., a connected components algorithm, a linear-time algorithm, a breadth-first search algorithm, etc.) to generate one or more directed graphs comprising computing elements having such performance problem(s) or performance alerts. For example, graph component 108 can employ a connected components algorithm to generate directed graph 308a and/or 308b illustrated in FIG. 3, where directed graph 308a and 308b can each comprise a directed acyclic graph (DAG).

In some embodiments, as depicted in FIG. 3, directed graph 308a can comprise only computing elements 306b of application layer 304 (e.g., nodes 11 and 13 depicted in FIG. 3). For instance, directed graph 308a can comprise only computing elements 306b of application layer 304 such as, for example, instances of application services that communicate with each other (e.g., nodes 11 and 13 depicted in FIG. 3).

In some embodiments, as depicted in FIG. 3, directed graph 308b can comprise one or more computing elements 306b of application layer 304 (e.g., nodes 1, 2, 3, 4, and 5 depicted in FIG. 3) and one or more computing elements 306a of infrastructure layer 302 (e.g., node B depicted in FIG. 3). For instance, directed graph 308b can comprise one or more computing elements 306b of application layer 304 such as, for example, instances of application services that communicate with each other (e.g., nodes 1, 2, 3, 4, and 5 depicted in FIG. 3) and on one or more computing elements 306a of infrastructure layer 302 such as, for example, a worker node on which such instances of application services can run (e.g., nodes 3 and 5 that can denote instances of application services that run on node B depicted in FIG. 3).

Based on generation of directed graph 308a and/or 308b by graph component 108 as described above, fault localization component 110 can, as described above with reference to FIG. 1, employ a topological sort algorithm to identify one or more of computing elements 306a and/or 306b causing the performance problems or performance alerts defined above using directed graph 308a and/or 308b. For example, fault localization component 110 can employ the topological sort algorithm to perform a topological sort (e.g., topological ordering, graph traversal, etc.) of directed graph 308a and/or 308b. In this example, such a topological sort of directed graph 308a and/or 308b can enable fault localization component 110 to identify one or more of computing elements 306a and/or 306b in directed graph 308a and/or 308b that are causing the performance problem(s) defined above using the topological relationships between such computing elements in such graph(s), where such topological relationships are visually represented in FIG. 3 as edges 310a and 310b.

As illustrated in FIG. 3, edges 310a (denoted as solid lines in FIG. 3) can comprise topological relationships between two computing elements 306b of application layer 304, while edges 310b (denoted as dashed lines in FIG. 3) can comprise topological relationships between a computing element 306b of application layer 304 (e.g., an instance of an application service) and a computing element 306a of infrastructure layer 302 (e.g., a worker node on which an instance of an application service can run). In an example, as illustrated in FIG. 3, edges 310a and 310b can comprise edges having an arrow positioned at one end to denote a dependency relationship between computing elements 306a and/or 306b of directed graph 308a and/or 308b.

Fault localization component 110 can employ a topological sort algorithm to perform a topological sort (e.g., topological ordering, graph traversal, etc.) of directed graph 308a and/or 308b to identify one or more of computing elements 306a and/or 306b in directed graph 308a and/or 308b that are causing the performance problem(s) defined above using edges 310a and/or 310b, and more specifically, using the direction of the arrows of edges 310a and/or 310b. For instance, as described above, nodes 3 and 5 depicted in FIG. 3 can comprise instances of application services that can run on a worker node denoted in FIG. 3 as node B. In this example, fault localization component 110 can employ the topological sort algorithm to perform a topological sort (e.g., topological ordering, graph traversal, etc.) to identify node B as the computing element that is causing a performance problem that affects nodes 3 and 5 by using the direction of the arrows of edges 310b that indicate nodes 3 and 5 depend on node B and therefore are affected by a performance problem caused by node B. In this example, as nodes 3 and 5 are affected by a performance problem caused by node B, fault localization component 110 can further employ the topological sort algorithm to perform a topological sort (e.g., topological ordering, graph traversal, etc.) to identify nodes 3 and 5 as the computing elements that are affecting performance of nodes 1 and 4 due to the performance problem caused by node B by using the direction of the arrows of edges 310a that indicate nodes 1 and 4 depend on nodes 3 and 5, respectively, and therefore nodes 1 and 4 are affected by a performance problem occurring on nodes 3 and 5, respectively. In this example, as node 4 is affected by a performance problem occurring on node 5, fault localization component 110 can further employ the topological sort algorithm to perform a topological sort (e.g., topological ordering, graph traversal, etc.) to identify node 4 as the computing element that is affecting performance of nodes 1 and 2 due to the performance problem caused by node B by using the direction of the arrows of edges 310a that indicate nodes 1 and 2 depend on node 4 and therefore nodes 1 and 2 are affected by a performance problem occurring on node 4.

Similar to the examples described above, in another example, nodes 11 and 13 of directed graph 308a depicted in FIG. 3 can comprise instances of application services that can communicate with each other in application layer 304. In this example, fault localization component 110 can employ the topological sort algorithm to perform a topological sort (e.g., topological ordering, graph traversal, etc.) to identify node 13 as the computing element that is causing a performance problem that affects node 11 by using the direction of the arrow of edge 310a that indicates node 11 depends on node 13 and therefore is affected by a performance problem caused by node 13.

Figure 4A:
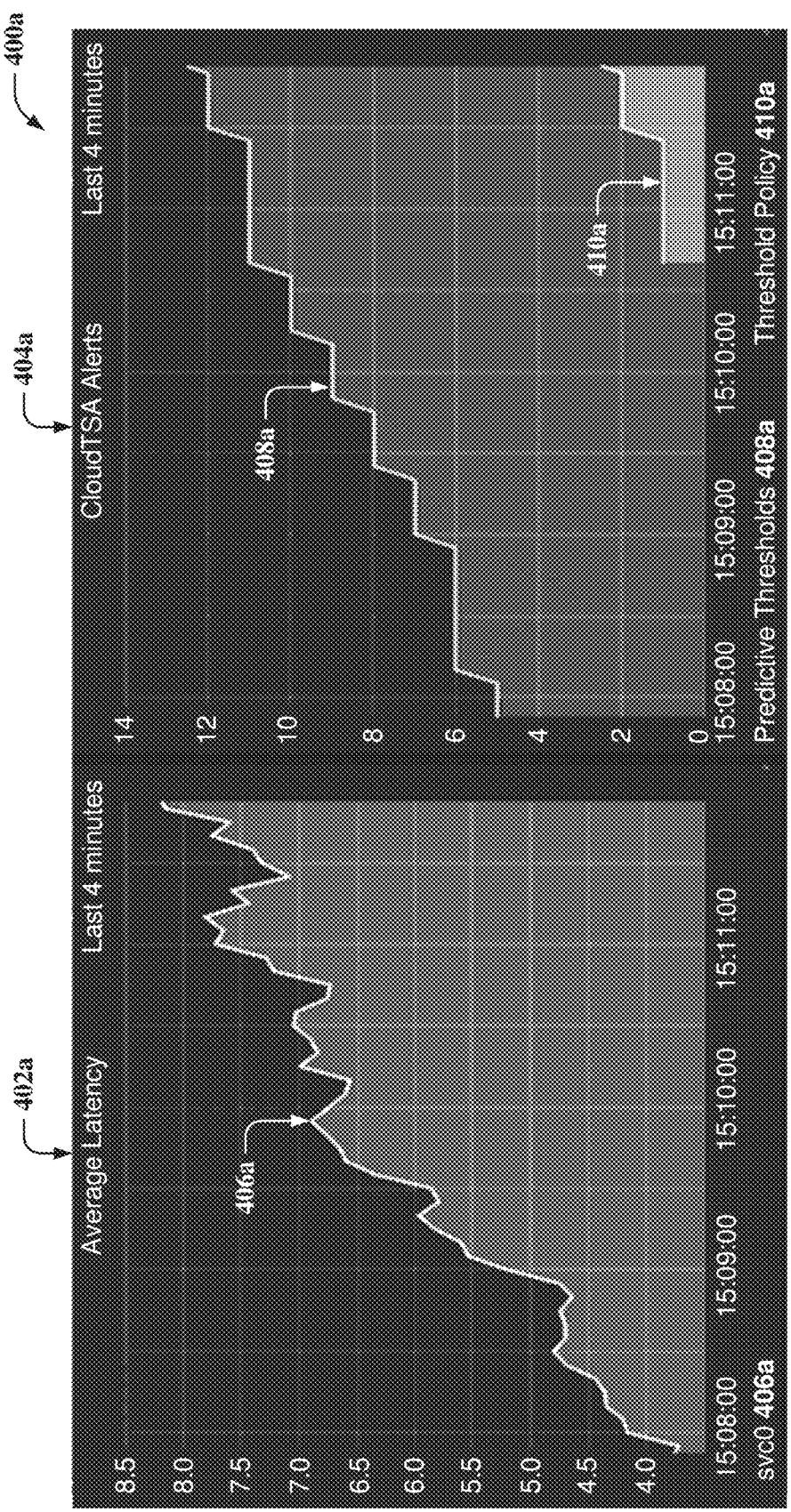
FIGS. 4A and 4B illustrate diagrams of example, non-limiting information that can facilitate fault localization and alert aggregation in accordance with one or more embodiments described herein.

FIG. 4A illustrates a diagram of an example, non-limiting information 400a that can facilitate fault localization and alert aggregation in accordance with one or more embodiments described herein. Repetitive description of like elements and/or processes employed in respective embodiments is omitted for sake of brevity.

Information 400a can comprise graph 402a and/or graph 404a as illustrated in FIG. 4A. In an example, graph 402a can comprise performance data such as, for instance, average latency data of a certain computing element operating in a computing environment (e.g., a cloud computing environment as denoted in FIG. 4A), where plot 406a of graph 402a can comprise a visual representation of such average latency data. In this example, graph 404a can comprise performance alter data corresponding to, for instance, such a certain computing element and/or one or more other computing elements of the computing environment, where plot 408a and/or plot 410a can comprise visual representations of such performance alert data. For instance, as illustrated in FIG. 4A, plot 408a can comprise a visual representation of predictive thresholds data and plot 410a can comprise a visual representation of threshold policy data.

Graph 402a and graph 404a can be utilized individually or in conjunction by one or more of the monitoring components described above with reference to FIG. 1 that can be employed by fault localization and alert aggregation system 102 and/or graph component 108 to monitor performance data of one or more computing elements and detect performance problems of such computing element(s) and/or performance alerts generated in response to such performance problems. In an example, fault localization and alert aggregation system 102 and/or graph component 108 can utilize a monitoring component that can employ a detection technique such as, for instance, cumulative sum control chart (CUSUM) based abrupt latency shift detection using a time series change detection algorithm to detect such performance problem(s) of such computing element(s). In this example, in implementing such a CUSUM based abrupt latency shift detection technique, the monitoring component can utilize graph 402a and/or graph 404a individually or in conjunction to identify one or more computing elements (e.g., nodes 1, 2, 3, 4, 5, 11, 13, and/or B depicted in FIG. 3) having performance problems and/or for which performance alerts have been issued.

Figure 4B:
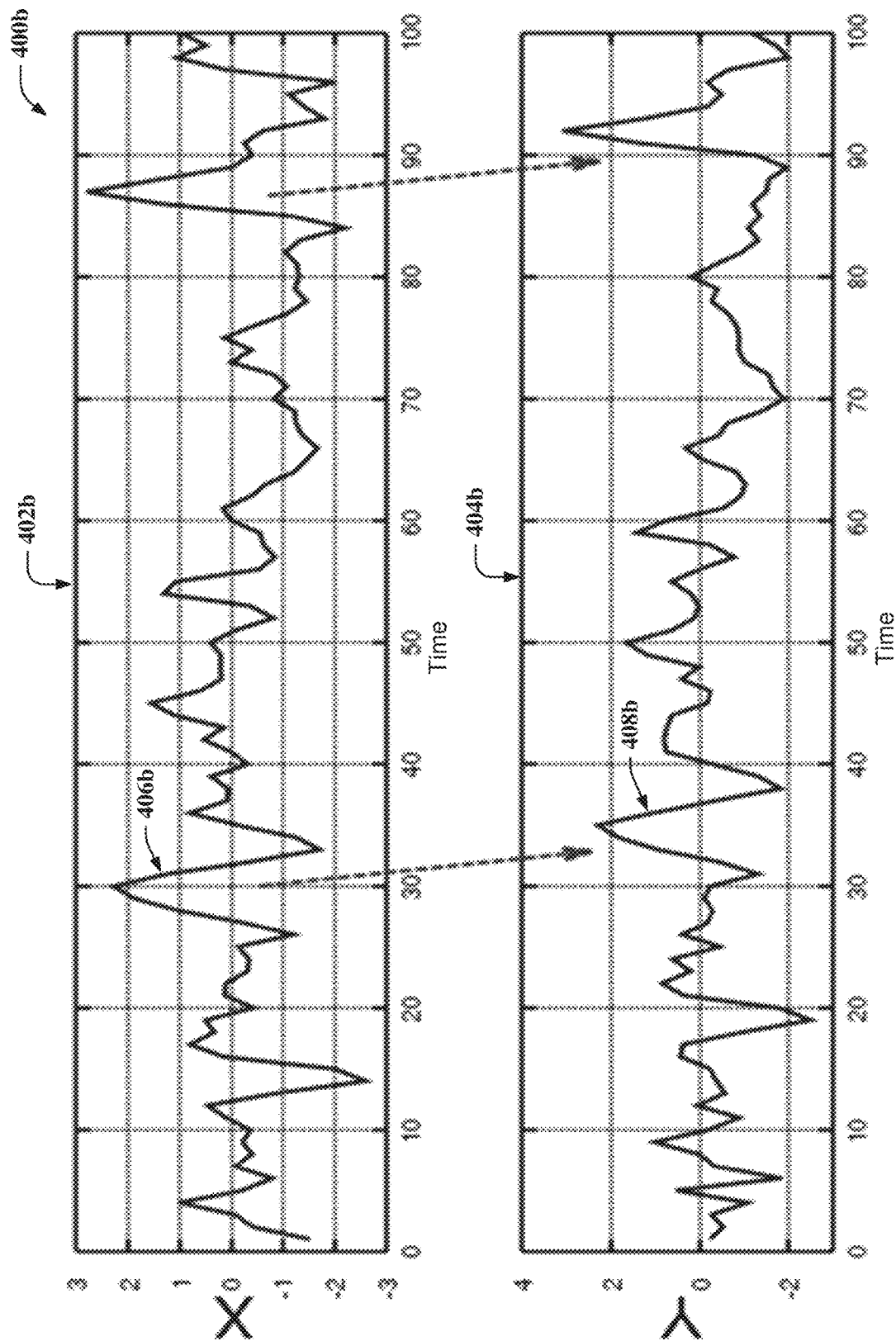

FIG. 4B illustrates a diagram of an example, non-limiting information 400b that can facilitate fault localization and alert aggregation in accordance with one or more embodiments described herein. Repetitive description of like elements and/or processes employed in respective embodiments is omitted for sake of brevity.

Information 400b can comprise graph 402b and/or graph 404b as illustrated in FIG. 4B. In an example, graph 402b can comprise performance data of a first computing element (denoted as computing element X in FIG. 4B) operating in a computing environment (e.g., a cloud computing environment), where plot 406b of graph 402b can comprise a visual representation of such performance data. In this example, graph 404b can comprise performance data of a second computing element (denoted as computing element Y in FIG. 4B) operating in such a computing environment, where plot 408b can comprise a visual representation of such performance data.

Graph 402b and graph 404b can be utilized individually or in conjunction by one or more of the monitoring components described above with reference to FIG. 1 that can be employed by fault localization and alert aggregation system 102 and/or graph component 108 to monitor performance data of one or more computing elements and detect performance problems of such computing element(s) and/or performance alerts generated in response to such performance problems. In an example, fault localization and alert aggregation system 102 and/or graph component 108 can utilize one or more of such monitoring components that can employ one or more detection techniques such as, for instance: causality tests; statistical hypothesis test (e.g., to determine if service degradations are cascaded or not); time series causality tests (e.g., Granger causality, convergent cross mapping) between key performance indicators (KPI) associated with respective computing elements (e.g., between KPIs associated with worker nodes and application services); statistical and time series based unsupervised causality analysis; and/or another detection technique.

In some embodiments, such one or more monitoring components described above that can be employed by fault localization and alert aggregation system 102 and/or graph component 108 to detect one or more such performance problems can further utilize such one or more detection techniques defined above to determine (e.g., infer) topological relationships (e.g., dependency relationships) between computing elements having such performance problem(s). For instance, such one or more monitoring components can further utilize such one or more detection techniques defined above to determine (e.g., infer) direction of the arrows on edges 310a and/or 310b described above and illustrated in FIG. 3. In this example, in implementing such one or more detection techniques defined above, the monitoring component(s) can utilize graph 402b and/or graph 404b individually or in conjunction to determine (e.g., infer) topological relationships (e.g., dependency relationships) between computing elements having such performance problem(s). For example, by detecting a spike in plot 406b that corresponds to a first computing element (e.g., the spike occurring around time=30 and/or time=87 as depicted in FIG. 4B), such monitoring component(s) can further monitor plot 408b that corresponds to a second computing element to determine whether a similar spike will occur on plot 408b (e.g., the spike occurring around time=35 and/or time=92 as depicted in FIG. 4B) within a defined amount of time (e.g., a second, a millisecond, a microsecond, etc.). In this example, if such monitoring component(s) detect such a spike on plot 406b and further detect a similar spike on plot 408b within such a defined amount of time, such monitoring component(s) can thereby infer that the computing element corresponding to plot 406b has a dependency relationship with the computing element corresponding to plot 408b.

Figure 5:
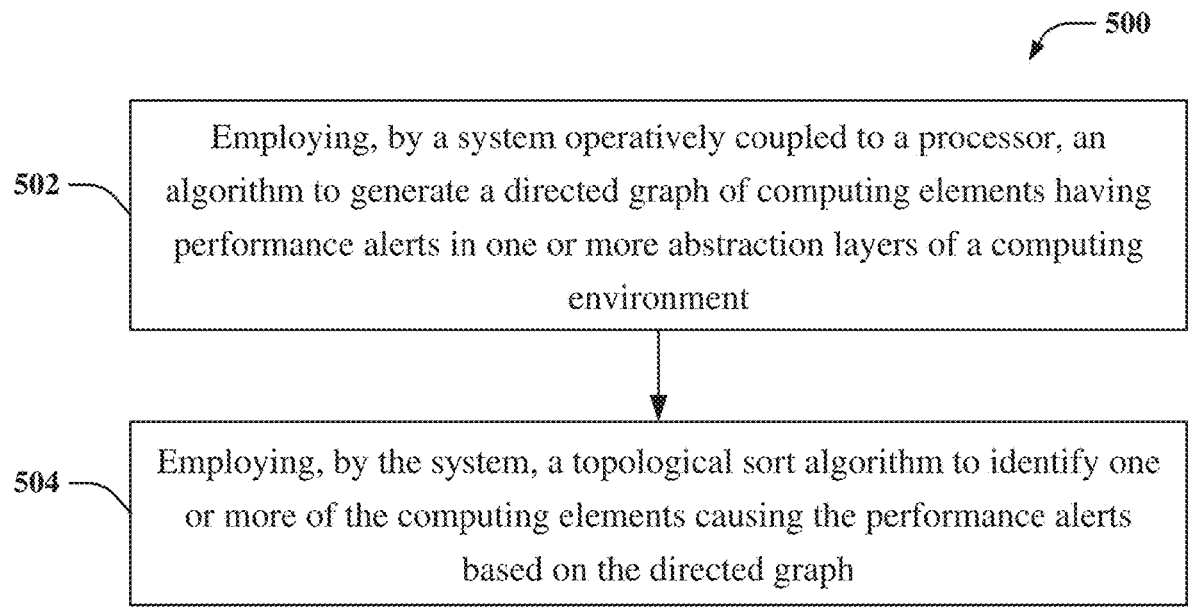
FIGS. 5, 6, and 7 illustrate flow diagrams of example, non-limiting computer-implemented methods that can facilitate fault localization and alert aggregation in accordance with one or more embodiments described herein.

FIG. 5 illustrates a flow diagram of an example, non-limiting computer-implemented method 500 that can facilitate fault localization and alert aggregation in accordance with one or more embodiments described herein. Repetitive description of like elements and/or processes employed in respective embodiments is omitted for sake of brevity.

Figure 9:
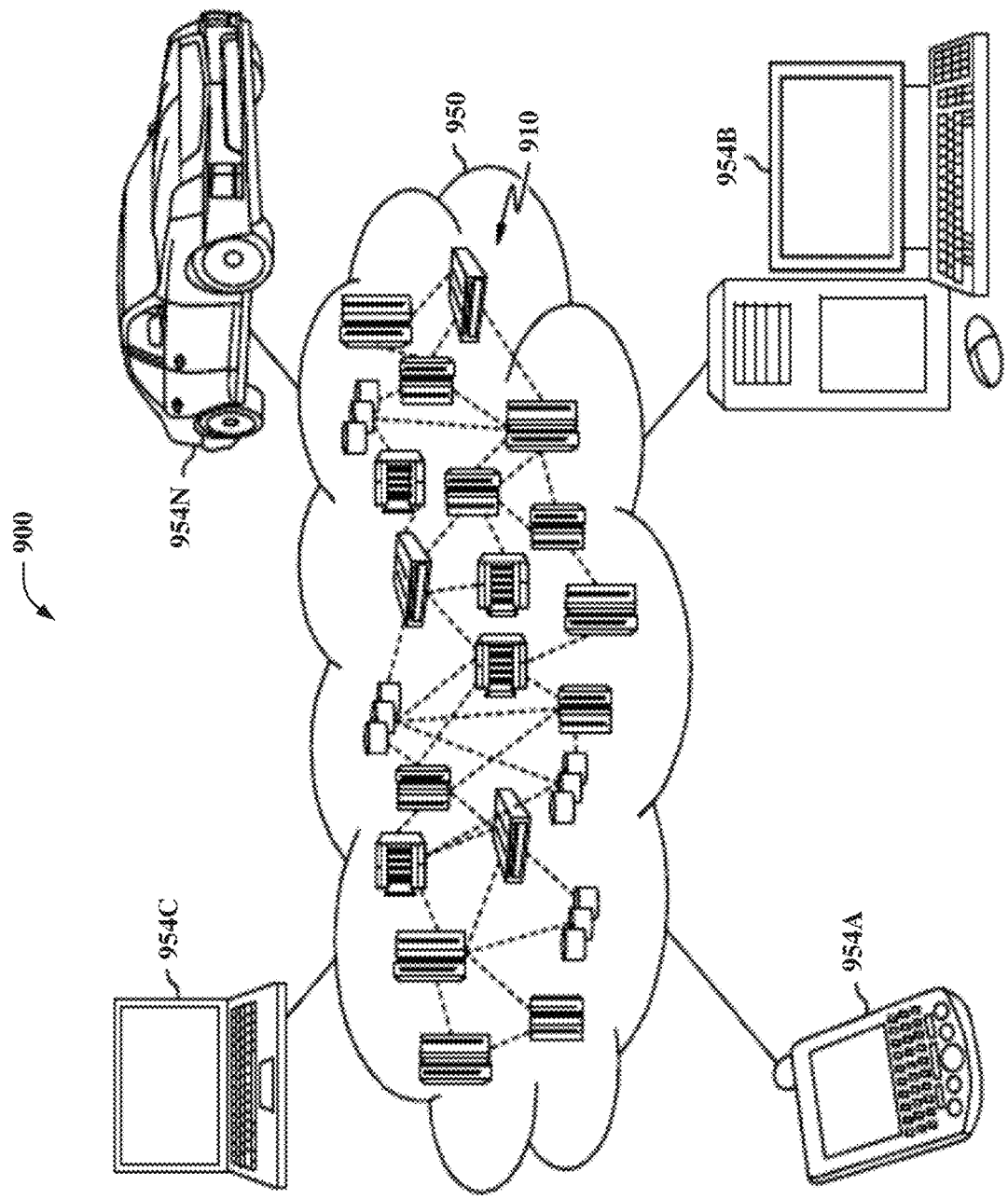
FIG. 9 illustrates a block diagram of an example, non-limiting cloud computing environment in accordance with one or more embodiments of the subject disclosure.

At 502, computer-implemented method 500 can comprise employing, by a system (e.g., via fault localization and alert aggregation system 102 and/or graph component 108) operatively coupled to a processor (e.g., processor 106), an algorithm (e.g., a connected components algorithm, a linear-time algorithm, a breadth-first search algorithm, etc.) to generate a directed graph (e.g., directed graph 308a and/or 308b described above and illustrated in FIG. 3) of computing elements (e.g., computing element 306a and/or 306b described above and illustrated in FIG. 3) having performance alerts in one or more abstraction layers (e.g., infrastructure layer 302 and/or application layer 304 described above and illustrated in FIG. 3) of a computing environment (e.g., a classical computing network, system 300 described above with reference to FIG. 3, cloud computing environment 950 described below and illustrated in FIG. 9, etc.).

At 504, computer-implemented method 500 can comprise employing, by the system (e.g., via fault localization and alert aggregation system 102 and/or fault localization component 110), a topological sort algorithm to identify one or more of the computing elements causing the performance alerts based on (e.g., using) the directed graph.

Figure 6:
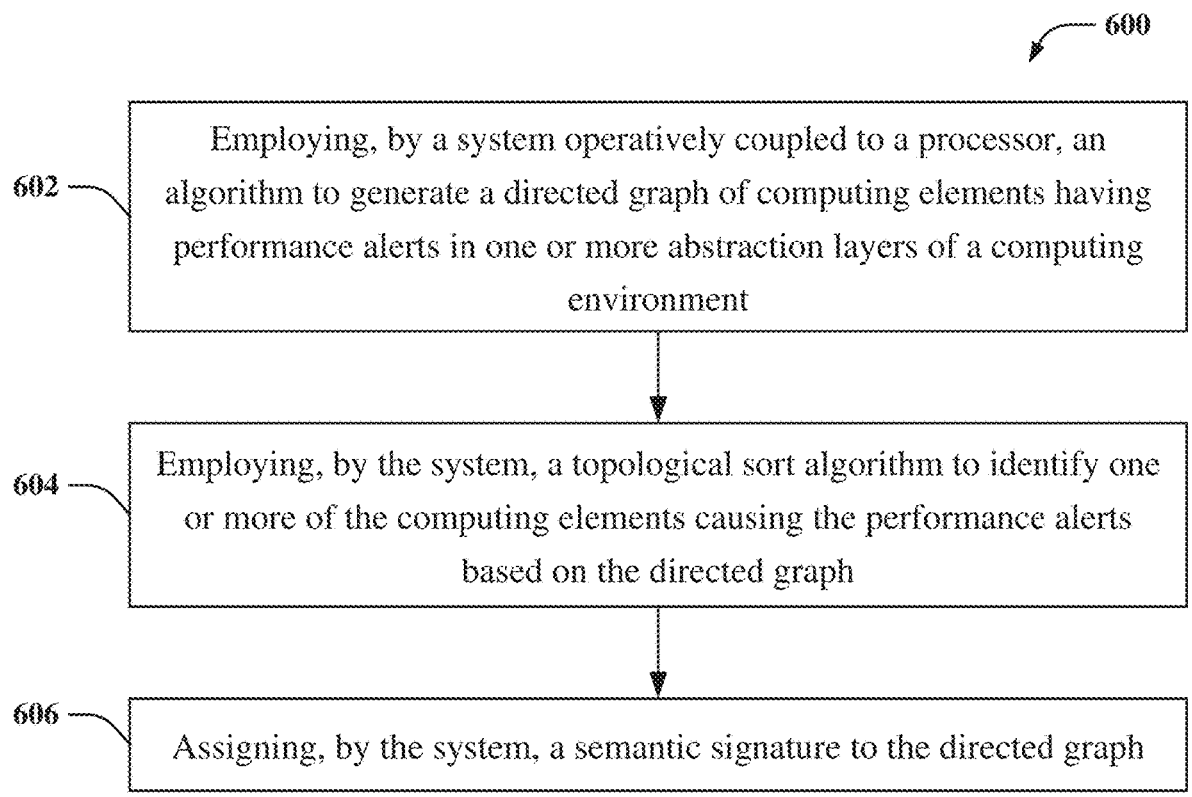

FIG. 6 illustrates a flow diagram of an example, non-limiting computer-implemented method 600 that can facilitate fault localization and alert aggregation in accordance with one or more embodiments described herein. Repetitive description of like elements and/or processes employed in respective embodiments is omitted for sake of brevity.

At 602, computer-implemented method 600 can comprise employing, by a system (e.g., via fault localization and alert aggregation system 102 and/or graph component 108) operatively coupled to a processor (e.g., processor 106), an algorithm (e.g., a connected components algorithm, a linear-time algorithm, a breadth-first search algorithm, etc.) to generate a directed graph (e.g., directed graph 308a and/or 308b described above and illustrated in FIG. 3) of computing elements (e.g., computing element 306a and/or 306b described above and illustrated in FIG. 3) having performance alerts in one or more abstraction layers (e.g., infrastructure layer 302 and/or application layer 304 described above and illustrated in FIG. 3) of a computing environment (e.g., a classical computing network, system 300 described above with reference to FIG. 3, cloud computing environment 950 described below and illustrated in FIG. 9, etc.).

At 604, computer-implemented method 600 can comprise employing, by the system (e.g., via fault localization and alert aggregation system 102 and/or fault localization component 110), a topological sort algorithm to identify one or more of the computing elements causing the performance alerts based on (e.g., using) the directed graph.

At 606, computer-implemented method 600 can comprise assigning, by the system (e.g., via fault localization and alert aggregation system 102 and/or signature component 204), a semantic signature to the directed graph (e.g., as described above with reference to FIG. 2).

Figure 7:
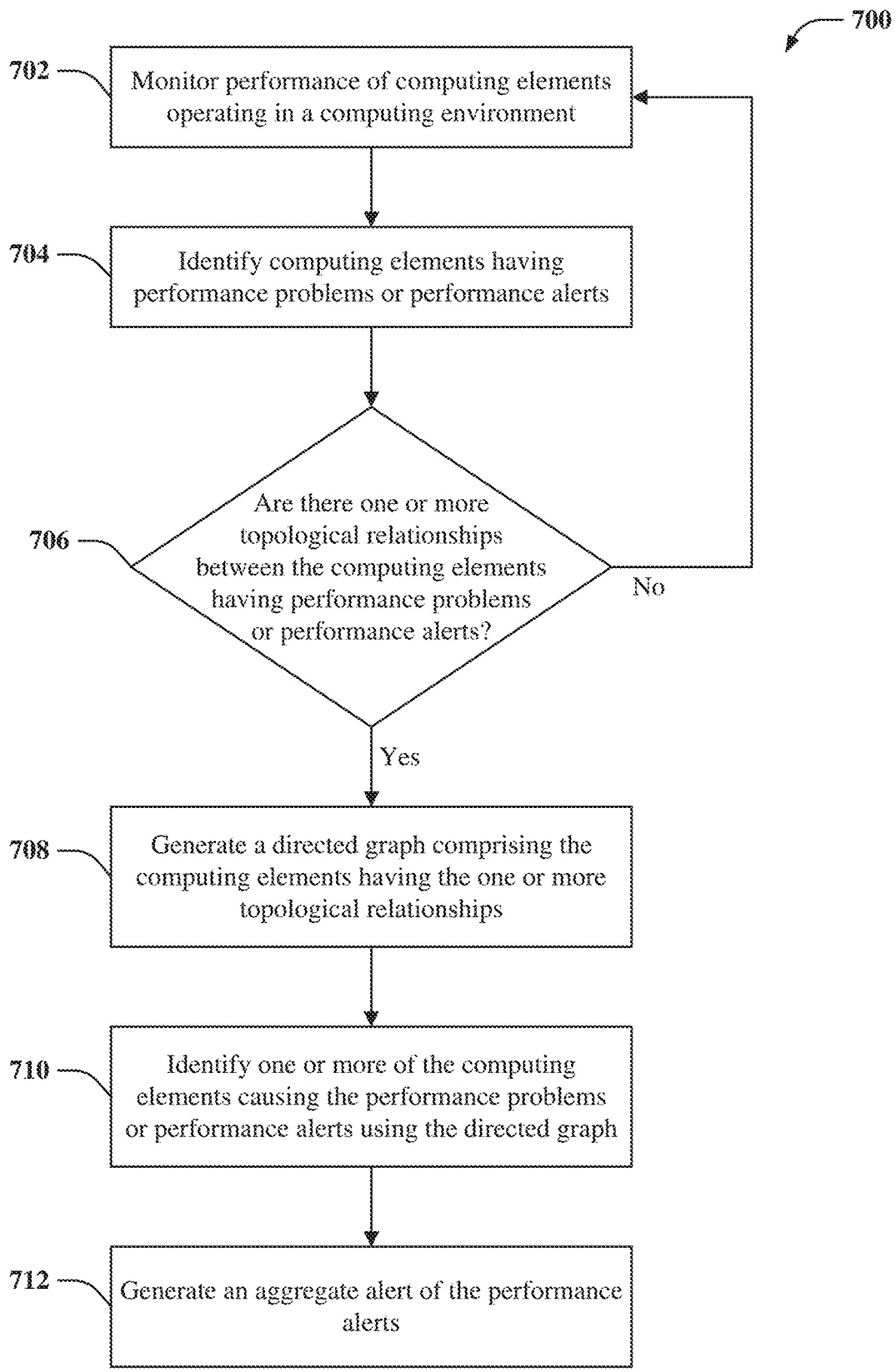

FIG. 7 illustrates a flow diagram of an example, non-limiting computer-implemented method 700 that can facilitate fault localization and alert aggregation in accordance with one or more embodiments described herein. Repetitive description of like elements and/or processes employed in respective embodiments is omitted for sake of brevity.

At 702, computer-implemented method 700 can comprise monitoring (e.g., via the monitoring component(s) described above with reference to FIGS. 1, 4A, and 4B that can be employed by fault localization and alert aggregation system 102 and/or graph component 108) performance of computing elements (e.g., computing elements 306a and/or 306b described above with reference to FIG. 3) operating in a computing environment (e.g., a classical computing network, a cloud computing environment, system 300 described above with reference to FIG. 3, etc.).

At 704, computer-implemented method 700 can comprise identifying (e.g., via the monitoring component(s) described above with reference to FIGS. 1, 4A, and 4B that can be employed by fault localization and alert aggregation system 102 and/or graph component 108) computing elements having performance problems or performance alerts (e.g., nodes 1, 2, 3, 4, 5, 11, 13, and/or B described above and depicted in FIG. 3).

At 706, computer-implemented method 700 can comprise determining (e.g., via the monitoring component(s) described above with reference to FIGS. 1, 4A, and 4B that can be employed by fault localization and alert aggregation system 102 and/or graph component 108) whether there are one or more topological relationships (e.g., dependencies) between the computing elements having performance problems or performance alerts.

If it is determined at 706 that there are not one or more topological relationships between the computing elements having performance problems or performance alerts, computer-implemented method 700 can repeat operations 702, 704, and 706. In an example, if it is determined at 706 that there are not one or more topological relationships between the computing elements having performance problems or performance alerts, this can indicate that such performance problems or performance alerts of the respective computing elements are not affecting other computing elements operating in the computing environment. In this example, computer-implemented method 700 can return to operation 702 to continue monitoring performance of the computing elements operating in the computing environment.

If it is determined at 706 that there are one or more topological relationships between the computing elements having performance problems or performance alerts, at 708, computer-implemented method 700 can comprise generating (e.g., via graph component 108) a directed graph (e.g., directed graph 308a and/or 308b described above and depicted in FIG. 3) comprising the computing elements having the one or more topological relationships.

At 710, computer-implemented method 700 can comprise identifying (e.g., via fault localization component 110) one or more of the computing elements causing the performance problems or performance alerts using the directed graph.

At 712, computer-implemented method 700 can comprise generating (e.g., via alert component 202) an aggregate alert of the performance alerts (e.g., an aggregate alert rendered in the form of the directed graph as described above with reference to FIG. 2).

Fault localization and alert aggregation system 102 can be associated with various technologies. For example, fault localization and alert aggregation system 102 can be associated with classical computing environment technologies (e.g., classical computing networks), cloud computing environment technologies, computing element monitoring technologies, computing environment fault localization technologies, computing environment performance alert technologies, machine learning technologies, artificial intelligence technologies, and/or other technologies.

Fault localization and alert aggregation system 102 can provide technical improvements to systems, devices, components, operational steps, and/or processing steps associated with the various technologies identified above. For example, fault localization and alert aggregation system 102 can employ an algorithm (e.g., a connected components algorithm, a linear-time algorithm, a breadth-first search algorithm, etc.) to generate a directed graph of computing elements having performance alerts in one or more abstraction layers of a computing environment; and/or employ a topological sort algorithm to identify one or more of the computing elements causing the performance alerts based on the directed graph. In this example, by generating an aggregate alert in the form of a visually displayed directed subgraph, fault localization and alert aggregation system 102 can thereby reduce the quantity of performance alerts submitted to an entity monitoring operations of a computing environment (e.g., an entity such as, for instance, a human, a client, a user, a computing device, a software application, an agent, a machine learning (ML) model, an artificial intelligence (AI) model, etc.)). In this example, by reducing the quantity of such performance alerts, fault localization and alert aggregation system 102 can thereby reduce alert fatigue of such an entity, which can enable the entity to better identify important performance alerts to avoid damaging and/or disrupting the operations of the computing elements. Additionally, or alternatively, in this example, by reducing the quantity of such performance alerts, fault localization and alert aggregation system 102 can thereby facilitate improved processing performance, improved processing efficiency, and/or reduced computational costs of a processor that generates and/or otherwise processes such performance alerts.

In another example, by generating a visually displayed directed subgraph that illustrates all the computing elements for which the performance alerts have been generated and the relationships between the computing elements across one or more abstraction layers, fault localization and alert aggregation system 102 can thereby improve identification of one or more of the computing elements causing the performance alerts. For instance, fault localization and alert aggregation system 102 can analyze the dependencies of the computing elements in the directed graph to quickly and accurately identify the one or more computing elements causing the performance alerts. In this example, based on such quick and accurate identification of the one or more computing elements causing the performance alters, an entity monitoring the computing elements can quickly implement specific measures targeting the one or more computing elements causing the performance alerts to avoid damaging and/or disrupting the operations of such computing element(s).

Fault localization and alert aggregation system 102 can provide technical improvements to a processing unit (e.g., processor 106) associated with a classical computing device and/or a quantum computing device (e.g., a quantum processor, quantum hardware, superconducting circuit, etc.) associated with fault localization and alert aggregation system 102. For example, as described above, by reducing the quantity of performance alerts generated for one or more computing elements in a computing environment, fault localization and alert aggregation system 102 can thereby facilitate improved processing performance, improved processing efficiency, and/or reduced computational costs of a processor (e.g., processor 106) that generates and/or otherwise processes such performance alerts. In another example, as described above, based on such quick and accurate identification by fault localization and alert aggregation system 102 of one or more computing elements causing the performance alters, an entity monitoring the computing elements can quickly implement specific measures targeting the one or more computing elements causing the performance alerts to avoid damaging and/or disrupting the operations of such computing element(s). In this example, such one or more computing elements causing the performance alerts can comprise and/or be associated with (e.g., operatively coupled to) a processing unit (e.g., processor 106) that can be protected by such an entity described above by utilizing fault localization and alert aggregation system 102.

Based on such improved alert aggregation and fault localization as described above, a practical application of fault localization and alert aggregation system 102 is that it can be implemented by an entity monitoring operations of a computing environment to facilitate: a) reduced alert fatigue; b) quick and accurate identification of the root cause of a performance problem occurring in a computing environment; and/or c) implementation of specific measures targeting the one or more computing elements causing the performance alerts to avoid damaging and/or disrupting the operations of such computing element(s).

It should be appreciated that fault localization and alert aggregation system 102 provides a new approach driven by relatively new computing environments (e.g., cloud computing environments) and/or relatively new computing elements (e.g., computing nodes, computing applications, etc.) operating in such computing environments. For example, fault localization and alert aggregation system 102 provides a new approach to aggregate performance alerts corresponding to one or more of the computing elements and/or a new approach to quickly and accurately identify the root cause of the performance alerts, which can enable an entity monitoring the computing elements to better protect them from damage and/or avoid disruption of their operations.

Fault localization and alert aggregation system 102 can employ hardware or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, etc.) to execute defined tasks related to the various technologies identified above. Fault localization and alert aggregation system 102 and/or components thereof, can be employed to solve new problems that arise through advancements in technologies mentioned above, employment of quantum computing systems, cloud computing systems, computer architecture, and/or another technology.

It is to be appreciated that fault localization and alert aggregation system 102 can utilize various combinations of electrical components, mechanical components, and circuitry that cannot be replicated in the mind of a human or performed by a human, as the various operations that can be executed by fault localization and alert aggregation system 102 and/or components thereof as described herein are operations that are greater than the capability of a human mind. For instance, the amount of data processed, the speed of processing such data, or the types of data processed by fault localization and alert aggregation system 102 over a certain period of time can be greater, faster, or different than the amount, speed, or data type that can be processed by a human mind over the same period of time.

According to several embodiments, fault localization and alert aggregation system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that fault localization and alert aggregation system 102 can include information that is impossible to obtain manually by an entity, such as a human user. For example, the type, amount, and/or variety of information included in fault localization and alert aggregation system 102, graph component 108, fault localization component 110, alert component 202, and/or signature component 204 can be more complex than information obtained manually by a human user.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
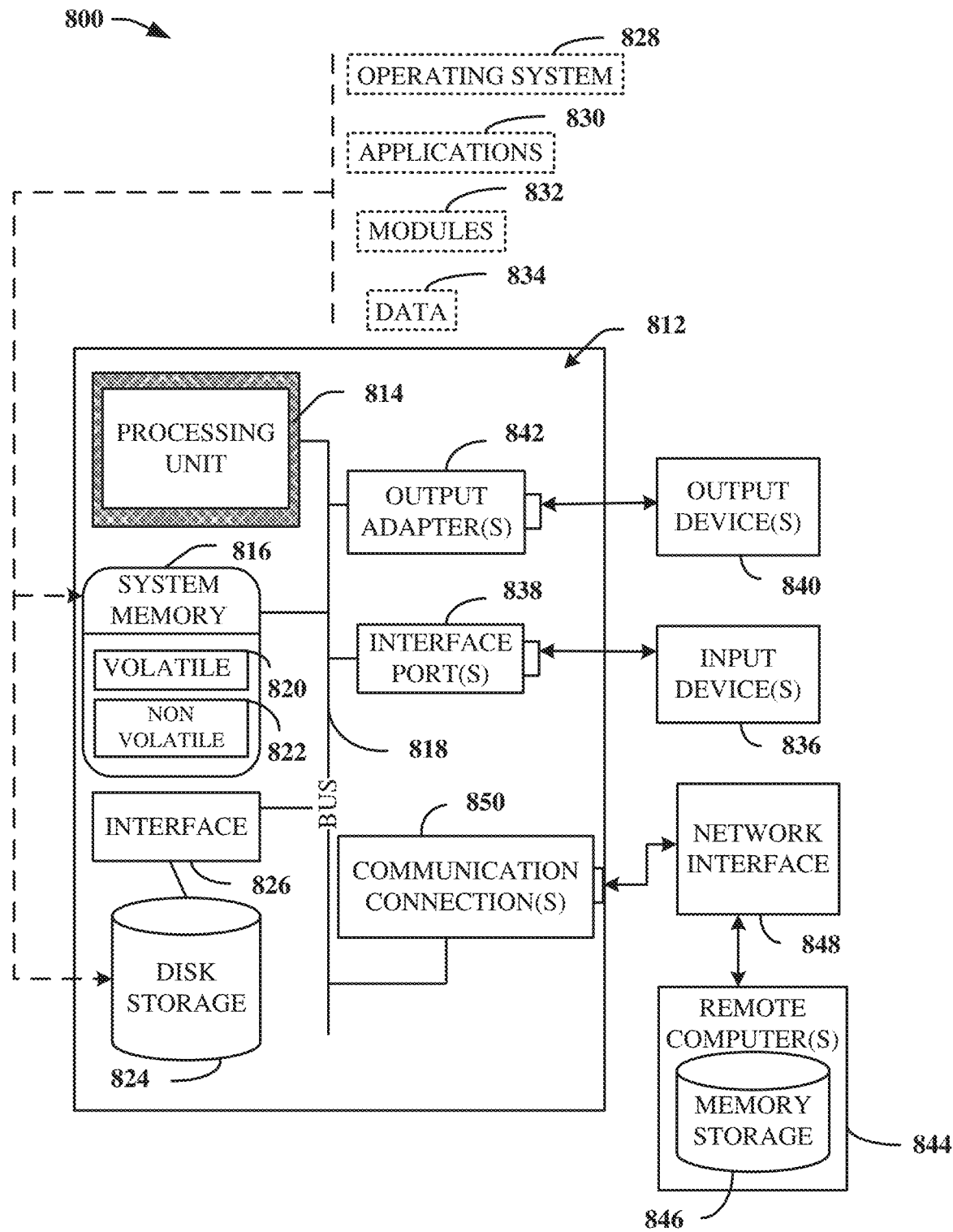
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Although not illustrated in FIG. 9, cloud computing nodes 910 can further comprise a quantum platform (e.g., quantum computer, quantum hardware, quantum software, etc.) with which local computing devices used by cloud consumers can communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
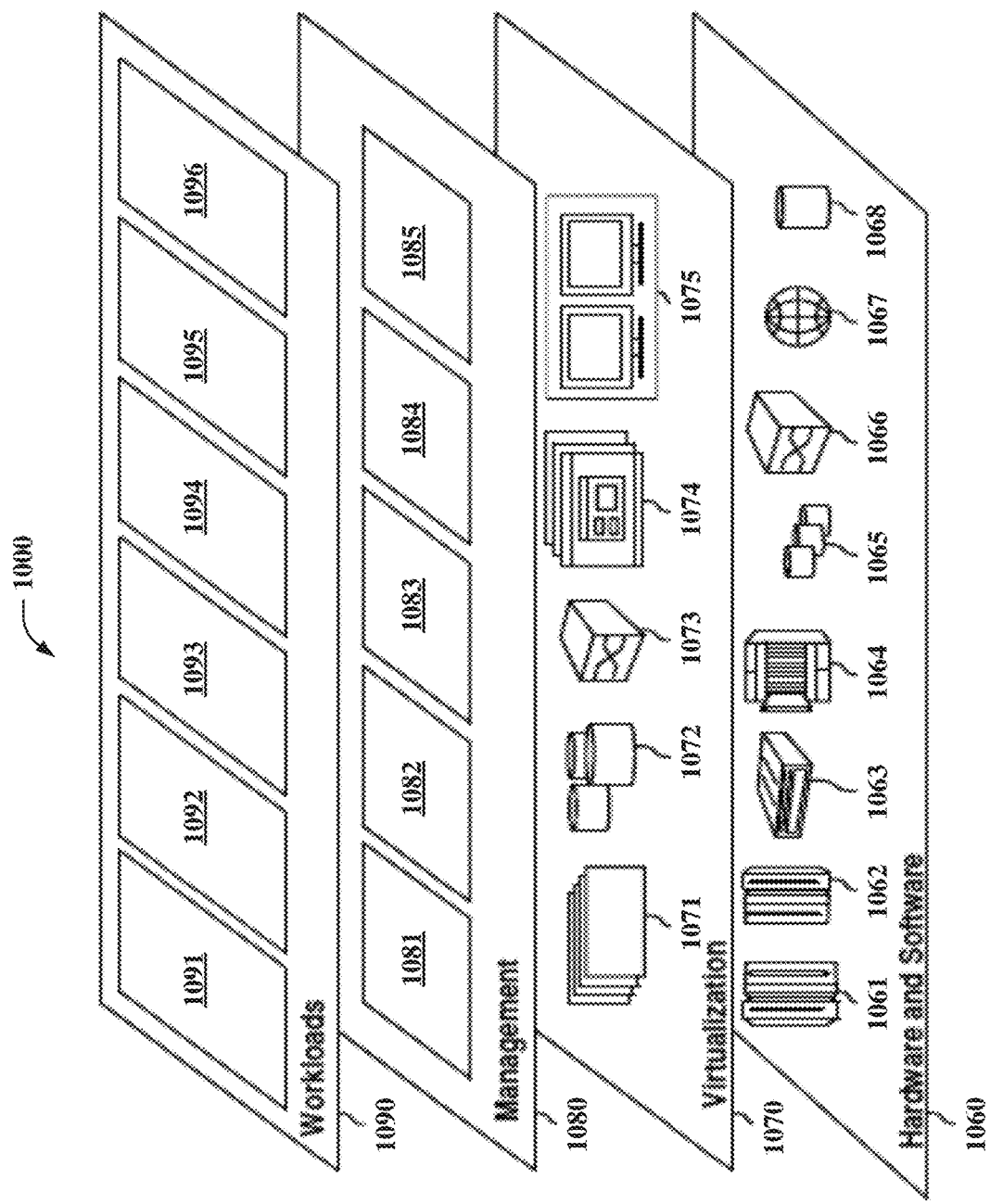
FIG. 10 illustrates a block diagram of example, non-limiting abstraction model layers in accordance with one or more embodiments of the subject disclosure.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067, database software 1068, quantum platform routing software (not illustrated in FIG. 10), and/or quantum software (not illustrated in FIG. 10).

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and fault localization and alert aggregation software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising: a memory that stores computer executable components; and a processor that executes the computer executable components stored in the memory, wherein the computer executable components comprise:
   a graph component that employs an algorithm to generate a directed graph of a computing elements in an affected state, wherein the computing elements in the affected state have performance alerts in one or more abstraction layers of a computing environment;
   a fault localization component that employs a topological sort algorithm to identify one or more of the computing elements causing the performance alerts based on the directed graph, wherein the topological sort algorithm comprises a topological ordering algorithm that identifies a first set of nodes as the computing elements that are affecting performance of a second set of nodes due to the performance by using a direction of the arrows of edges that indicate the second set of nodes depend on the first set of nodes;
   a signature component that assigns a semantic signature to the directed graph, wherein the semantic signature comprises a topological signature that denotes a certain shape of the directed graph; and
   an alert component that generates a performance alert or an aggregate alert of the performance alerts based on a determination that a mean latency metric deviates by a defined amount from a predicted value, wherein the predicted value is generated based on a time series forecasting algorithm.

2. The system of claim 1, wherein the directed graph comprises a visual representation of one or more topological relationships of the computing elements across the one or more abstraction layers, and wherein the graph component uses nodes of a first color to represent computing elements having performance alerts and uses nodes of a second color to represent computing elements that fail to have performance alerts, and wherein the first color is distinct from the second color.

3. The system of claim 1, wherein the computing elements comprise at least one of an application service or a worker node, and wherein the one or more abstraction layers comprise at least one of an application layer or an infrastructure layer.

4. The system of claim 1, wherein the alert component also:
   assigns one or more alert suppression rules to the aggregate alert to reduce a quantity of at least one of the performance alerts or the aggregate alert, thereby facilitating at least one of improved processing performance, improved processing efficiency, or reduced computational costs of the processor.

5. A computer-implemented method, comprising:
   employing, by a system operatively coupled to a processor, an algorithm to generate a directed graph of computing elements in an affected state, wherein a computing elements in the affected state have performance alerts in one or more abstraction layers of a computing environment, wherein the one or more abstract layer comprises combined application and infrastructure topology;

employing, by the system, a topological sort algorithm to identify one or more of the computing elements causing the performance alerts based on the directed graph, wherein the topological sort algorithm comprises a topological ordering algorithm that identifies a first set of nodes as the computing elements that are affecting performance of a second set of nodes due to the performance by using a direction of the arrows of edges that indicate the second set of nodes depend on the first set of nodes and wherein a first one or more of the edges is a solid line representing a dependency between nodes of a same application layer and wherein a second one or more of the edges is a dashed line representing a dependency between nodes of an application layer and an infrastructure layer;

generating, by the system, the performance alerts based on a determination that a mean latency metric deviates by a defined amount from a predicted value, wherein the predicted value is generated based on a time series forecasting algorithm; and displaying, by the system, in a first manner, the one or more of the computing elements causing the performance alerts and displaying, by the system, in a second manner, others of the computing elements that fail to cause the performance alerts and wherein the first manner is distinct from the second manner.

6. The computer-implemented method of claim 5, wherein the directed graph comprises a visual representation of one or more topological relationships of the computing elements across the one or more abstraction layers, and wherein the first manner is representation in a first color and wherein the second manner is representation in a second color.

7. The computer-implemented method of claim 5, wherein the infrastructure layer is represented by a link between multiple application services and by an application service.

8. The computer-implemented method of claim 5, further comprising:
generating, by the system, an aggregate alert of the performance alerts based on at least one of a structural change to the directed graph or a change to a key performance indicator vector corresponding to the directed graph.

9. The computer-implemented method of claim 5, further comprising:
generating, by the system, an aggregate alert of the performance alerts; and
assigning, by the system, one or more alert suppression rules to the aggregate alert to reduce a quantity of at least one of the performance alerts or the aggregate alert, thereby facilitating at least one of improved processing performance, improved processing efficiency, or reduced computational costs of the processor.

10. A computer program product facilitating a fault localization and performance alert aggregation process, the computer program product comprising a computer readable storage medium having program instructions embodied therewith, the program instructions executable by a processor to cause the processor to:

employ, by the processor, abrupt latency shift detection comprising time-series change data to detect a performance defect of computing elements;

employ, by the processor, an algorithm to generate a directed graph of a computing elements in an affected state, wherein the computing elements in the affected state have performance alerts in one or more abstraction layers of a computing environment, wherein the one or more abstract layer comprises combined application and infrastructure topology, and wherein one or more of the edges is a dashed line representing a dependency between nodes of an application layer and an infrastructure layer;

employ, by the processor, a topological sort algorithm to identify one or more of the computing elements causing the performance alerts based on the directed graph, wherein the topological sort algorithm comprises a topological ordering algorithm that identifies a first set of nodes as the computing elements that are affecting performance of a second set of nodes due to the performance by using a direction of the arrows of edges that indicate the second set of nodes depend on the first set of nodes; and generate, by the processor, the performance alerts based on a determination that a mean latency metric deviates by a defined amount from a predicted value, wherein the predicted value is generated based on a time series forecasting algorithm.

11. The computer program product of claim 10, wherein the directed graph comprises a visual representation of one or more topological relationships of the computing elements across the one or more abstraction layers.

12. The computer program product of claim 11, wherein the computing elements comprise at least one of an application service or a worker node, and wherein the one or more abstraction layers comprise at least one of an application layer or an infrastructure layer.

13. The computer program product of claim 10, wherein the program instructions are further executable by the processor to cause the processor to:
generate, by the processor, an aggregate alert of the performance alerts based on at least one of a structural change to the directed graph and a change to a key performance indicator vector corresponding to the directed graph.

14. The computer program product of claim 10, wherein the program instructions are further executable by the processor to cause the processor to:
generate, by the processor, an aggregate alert of the performance alerts; and
assign, by the processor, one or more alert suppression rules to the aggregate alert to reduce a quantity of at least one of the performance alerts or the aggregate alert, thereby facilitating at least one of improved processing performance, improved processing efficiency, or reduced computational costs of the processor.

15. A system, comprising:
a memory that stores computer executable components; and
a processor that executes the computer executable components stored in the memory, wherein the computer executable components comprise:
a monitoring component that employs abrupt latency shift detection comprising time-series change data to detect a performance defect of computing elements;
a graph component that employs an algorithm to generate a directed graph of a computing elements in an affected state, wherein the computing elements in the affected state have performance alerts in one or more abstraction layers of a computing environment;

a fault localization component that employs a topological sort algorithm to identify one or more of the computing elements causing the performance alerts based on the directed graph, wherein the topological sort algorithm comprises a topological ordering algorithm that identifies a first set of nodes as the computing elements that are affecting performance of a second set of nodes due to the performance by using a direction of the arrows of edges that indicate the second set of nodes depend on the first set of nodes, and wherein the monitoring component employs the abrupt latency shift detection to determine a direction of the arrows of the edges;

a signature component that assigns a semantic signature to the directed graph, wherein the semantic signature comprises a topological signature that denotes a certain shape of the directed graph; and an alert component that generates a performance alert or an aggregate alert of the performance alerts based on a determination that a mean latency metric deviates by a defined amount from a predicted value.

16. The system of claim 15, wherein the directed graph comprises a visual representation of one or more topological relationships of the computing elements across the one or more abstraction layers.

17. The system of claim 15, wherein the computing elements comprise at least one of an application service or a worker node, and wherein the one or more abstraction layers comprise at least one of an application layer or an infrastructure layer.

18. The system of claim 15, wherein the semantic signature further comprises a temporal signature, and wherein the semantic signature comprises at least one of a textual description or a graphical description of the directed graph.

19. A computer-implemented method, comprising:
employing, by a system operatively coupled to a processor, abrupt latency shift detection comprising time-series change data to detect a performance defect of computing elements;

employing, by the system, an algorithm to generate a directed graph of computing elements in an affected state, wherein a computing elements in the affected state have performance alerts in one or more abstraction layers of a computing environment;

employing, by the system, a topological sort algorithm to identify one or more of the computing elements causing the performance alerts based on the directed graph;

assigning, by the system, a semantic signature to the directed graph, wherein the semantic signature comprises a topological signature that denotes a certain shape of the directed graph; and generating, by the system, an aggregate alert of the performance alerts based on a structural change to the directed graph and based on a determination that a mean latency metric deviates by a defined amount from a predicted value.

20. The computer-implemented method of claim 19, wherein the directed graph comprises a visual representation of one or more topological relationships of the computing elements across the one or more abstraction layers.

21. The computer-implemented method of claim 19, wherein the computing elements comprise at least one of an application service or a worker node, and wherein the one or more abstraction layers comprise at least one of an application layer or an infrastructure layer.

22. The computer-implemented method of claim 19, wherein the semantic signature further comprises a temporal signature, and wherein the semantic signature comprises at least one of a textual description or a graphical description of the directed graph.

23. The computer-implemented method of claim 19, further comprising: generating, by the system, the aggregate alert of the performance alerts also based on a change to a key performance indicator vector corresponding to the directed graph, and wherein the structural change comprises at least one of a first addition or removal of one or more of the computing elements in the directed graph or a second addition or removal of one or more abstraction layers in the directed graph.

* * * * *